United States Patent [19]
Wiedemann et al.

[11] Patent Number: 5,345,602
[45] Date of Patent: Sep. 6, 1994

[54] RECEIVER WITH MULTIPLE ANTENNAS

[75] Inventors: Kurt Wiedemann, Hildesheim; Heiko Brüshaber, Salzgitter, both of Fed. Rep. of Germany

[73] Assignee: Blaupunkt Werke GmbH, Hildesheim, Fed. Rep. of Germany

[21] Appl. No.: 935,848

[22] Filed: Aug. 26, 1992

[30] Foreign Application Priority Data

Sep. 7, 1991 [DE] Fed. Rep. of Germany ....... 4129830

[51] Int. Cl.$^5$ .......................... H04B 1/06; H04B 7/02
[52] U.S. Cl. .................. 455/137; 455/186.1; 455/276.1
[58] Field of Search ............ 455/137, 139, 140, 185.1, 455/186.1, 152.1, 180.3, 184.1, 187.1, 276.1

[56] References Cited

U.S. PATENT DOCUMENTS 4,939,791  7/1990  Bochmann et al. ................. 455/276

FOREIGN PATENT DOCUMENTS 3200851  1/1982  Fed. Rep. of Germany ...... 455/344
3432848  3/1986  Fed. Rep. of Germany .
  60115  8/1987  Japan ................................. 455/152.1

OTHER PUBLICATIONS

Eur. Broadcasting Union, Specifications of the Radio Data System RDS for VHF/FM Sound Broadcasting, Tech. 3244-E, pp. 1-2 and 29-31, definitions 5 & 11 (Brussels, Mar. 1984).

*Primary Examiner*—Reinhard J. Eisenzopf
*Assistant Examiner*—Thanh C. Le
*Attorney, Agent, or Firm*—Frishauf, Holtz, Goodman & Woodward

[57] ABSTRACT

A VHF radio receiver intended for mobile use, e.g. in a car, features inputs from multiple antennas. Each antenna signal is mixed with a locally-generated oscillator signal; the resulting mixed signals are added, with controllable phase position, to form a summation signal. Alternate frequencies, as defined by the Radio Data System (RDS) international standard, are stored. At periodic time intervals, momentary switchover is made to alternate frequencies to measure their reception quality and to store this parameter. Whenever the originally-tuned frequency provides inadequate reception quality, a control circuit 19 switches over to the best of the alternate frequencies, so quickly that the changeover is almost imperceptible to the listener.

4 Claims, 1 Drawing Sheet

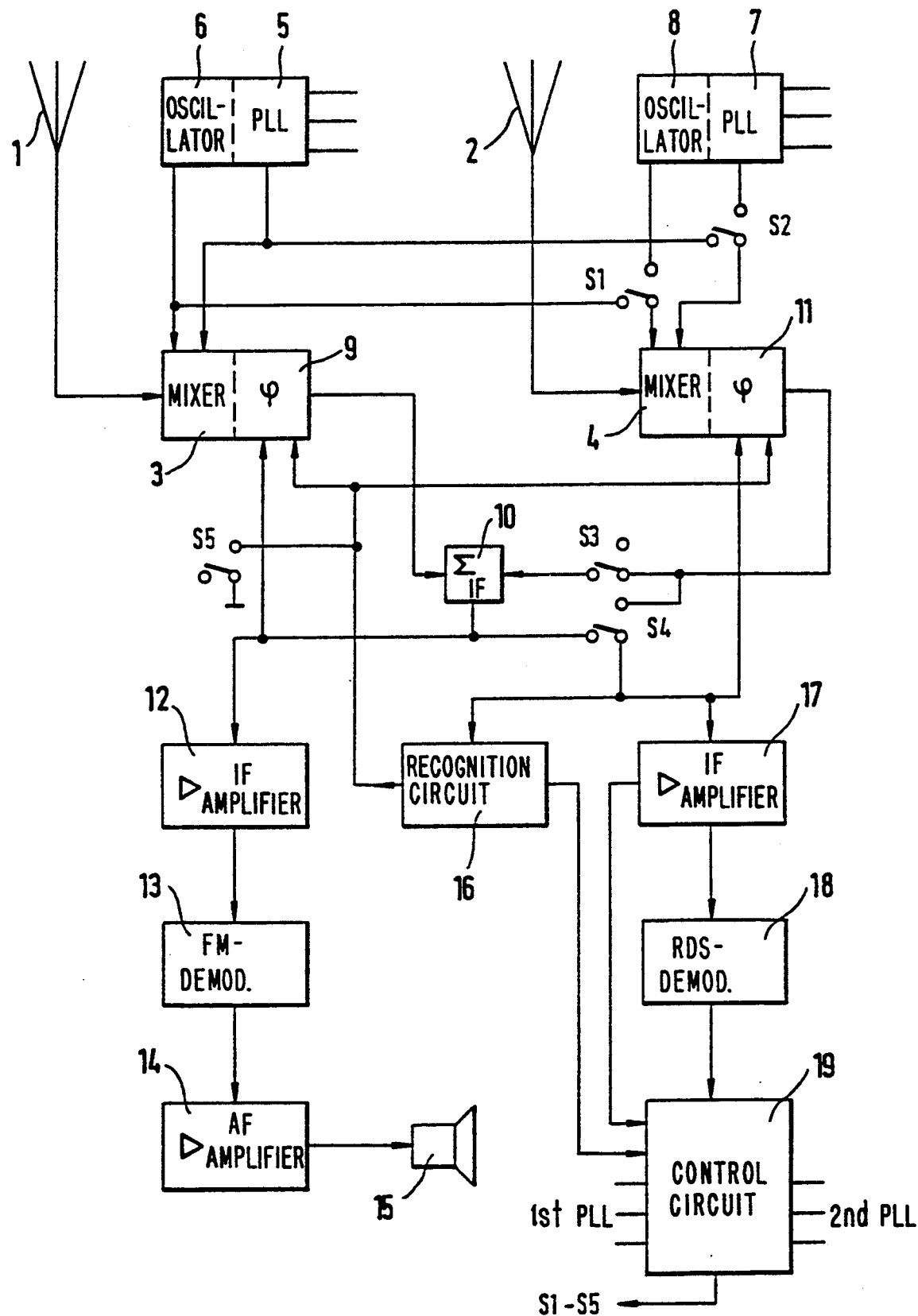

RECEIVER WITH MULTIPLE ANTENNAS

Cross-reference to related patents of Blaupunkt Werke GmbH and its parent company Robert Bosch GmbH, the disclosures of which are hereby incorporated by reference:

U.S. Pat. No. 4,862,513, BRAGAS, issued Aug. 29, 1989, entitled RADIO RECEIVER WITH TWO DIFFERENT TRAFFIC INFORMATION DECODERS;

U.S. Pat. No. 4,939,791, BOCHMANN & WIEDEMANN, issued Jul. 3, 1990, DIVERSITY RADIO RECEIVER FOR USE WITH MULTIPLE ANTENNA CAR RADIO;

U.S. Pat. No. 5,020,143, DUCKECK & BRAGAS, issued May 28, 1991, based on German pending application P 38 10 177.7 (attorney docket no. 891031-MO, R. 21748);

U.S. Pat. No. 5,095,532, MARDUS, issued Mar. 10, 1992, based on German pending application P 37 24 516.3 (attorney docket no. 891030-MO, R. 21331);

U.S. Pat. No. 5,101,510, DUCKECK, issued Mar. 31, 1992, (attorney docket no. 890989-MO, R. 21921);

U.S. Pat. No. 4,888,699, KNOLL et al., issued Dec. 19, 1989.

U.S. Pat. No. 5,222,252, Kässer, issued Jun. 22, 1993, STEREO RADIO RECEIVER MULTIPATH DISTURBANCE DETECTION CIRCUIT.

CROSS-REFERENCE TO RELATED LITERATURE

European Broadcasting Union Technical Standard 3244-E, entitled SPECIFICATIONS OF THE RADIO DATA SYSTEM RDS FOR VHF/FM SOUND BROADCASTING (EBU Technical Centre, Brussels, Mar. '84, 60 pp.);

FIELD OF THE INVENTION

The invention relates to a VHF receiver with a Radio Data System (RDS) demodulator and multiple antennas.

BACKGROUND

By means of the receiver for a motor vehicle, which is known from U.S. Pat. No. 4,939,791, BOCHMANN & WIEDEMANN, and corresponding German patent disclosure DE 37 41 698 (A1), an incoming program signal can be received with good quality over a relatively long driving distance without a change to a different transmitter frequency.

To travel beyond the range of the detected transmitter, however, tuning to a different transmitter frequency containing the same program signal is necessary. Consequently, it may be necessary for a transmitter search run to check several alternative frequencies for their reception quality. This can lead to interruptions in reproduction of the program signal.

German patent disclosure DE 34 32 848 C2 MIELKE, teaches that, in the Radio Data System (RDS), a list of alternative frequencies can be transmitted as contents of the data signal modulating a 57 kHz auxiliary carrier. This information is intended especially for mobile reception, and indicates at which frequencies a particular program is being broadcast by the same transmitter chain. Thereby appropriately designed receivers, having memories, will be able to store this list and thus shorten the time necessary for tuning the receiver to the prevailing optimum frequency of the list.

THE INVENTION

A primary object of the present invention is to improve a conventional VHF receiver by providing that it switches to an alternative frequency without interruption of the received program signal whenever reception quality drops below a predesignated level.

The advantages achieved with the invention consist in particular in the fact that a temporarily stored list of reception-quality alternative frequencies is updated without an additional mixing stage, while the received program signal is reproduced without interruption, both during updating of the list and during a change to one of the alternative frequencies.

DRAWING

A practical example of the invention is illustrated as a greatly simplified block diagram in the single FIGURE and will be described in more detail below.

DETAILED DESCRIPTION

In the VHF receiver, connected to a first antenna 1 and to a second antenna 2, there are provided configuration or changeover switches S1 to S5 which, in the illustrated first switch position, configure the receiver in such a way that the signal received by each antenna is mixed with a carrier generated in the receiver, and the resulting mixed signals are added, with controllable phase angle, to obtain a summation signal, the phase angles of the mixed signals to be added being controlled respectively as a function of the phase difference between the respective mixed signal and the summation signal. Such a receiver, intended for four antennas, is described in my earlier U.S. Pat. No. 4,939,791 and German patent disclosure DE 37 41 698.

The present embodiment shows a receiver designed for two antennas, wherein the first antenna 1 is connected to a first mixer 3 and the second antenna 2 is connected to a second mixer 4. A first oscillator 6, connected to a first PLL (Phase Locked Loop) 5, is associated with the first mixer 3, and a second oscillator 8, connected to a second PLL 7, is associated with the second mixer 4. The first oscillator 6 is connected to the first mixer 3 and, via changeover switch S1, to the second mixer 4. The output of the first PLL 5, delivering the tuning voltage for input circuit selection, is connected to the first mixer 3 and, via changeover switch S2, to the second mixer 4.

The output of the first mixer 3 is connected, via a first controlling element 9, controlling the phase angle of the IF (Intermediate Frequency) signal, to an input of a summing stage 10, and the output of the second mixer 4 is connected, via a second controlling element 11, controlling the phase angle of the IF signal, and via changeover switch S3, to a further input of summing stage 10.

The output of summing stage 10 is connected to a control input of the first controlling element 9 and to the input of a first IF amplifier 12, to the output side of which are connected an FM demodulator 13, to an AF (Audio Frequency) amplifier 14, and to at least one speaker 15.

The output of summing stage 10 is also connected, via changeover switch S4, to a control input of the second controlling element 11, to the input of a recognition circuit 16 for recognizing multipath reception, and to the input of a second IF amplifier 17, to the output side of which there is connected an RDS (Radio Data System) demodulator 18. One output of recognition circuit 16 is connected to the second control inputs of controlling elements 9, 11. The output of RDS demodulator 18 is connected to a controller 19, which contains a temporary or buffer memory for alternative reception frequencies, an evaluation circuit for determining the reception quality of detected and checked transmitters, a control circuit for the two PLL's, and for configuration/changeover switches S1–S5.

For determination of reception-quality transmitters, controller 19 is supplied with field-strength-dependent signals from the second IF stage 17 and with multipath-reception-dependent signals (AM-modulation-dependent signals) from recognition circuit 16.

In the illustrated first switch configuration, the two mixers 3, 4 are tuned to the same reception frequency by means of the first oscillator 6 and the first PLL 5. In this process, the phase angles of the IF signals to be added in summing stage 10 are each controlled as a function of the phase difference between the respective IF signal and the IF summation signal, as well as the amplitude-demodulation components, in such a way that qualitatively optimum reception is achieved. During reception, the data of the frequencies alternative to that of the currently received transmitter, which data were communicated in coded form by the transmitter and were acquired in the RDS demodulator, are filed in the temporary memory.

At predesignated instants, controller 19 switches changeover switches S1 to S5 briefly to their second switch position. During these short time intervals, changeover switch S1 switches the second mixer 4 from the first oscillator 6 to the second oscillator 8, changeover switch S2 switches the second mixer 4 from the first PLL 5 to the second PLL 7, changeover switch S3 disconnects the additional input of summing stage 10 from the output of the second controlling element 11, changeover switch S4 switches the inputs of recognition circuit 16 and of the second IF amplifier 17 from the output of summing circuit 10 to the output of the second controlling element 11, and changeover switch 5 connects the second control inputs of controlling elements 9, 11 to ground.

During this second switch position, controller 19, by means of the second oscillator 8, tunes the second mixer 4 successively to the stored alternative frequencies carrying the same program signal. The values then determined respectively from the field strength and from the amplitude-demodulation components for the reception quality are also temporarily stored. After updating of the list with the alternative frequencies, the receiver switches back to the first switch position or configuration.

If the quality of reception from the transmitter being detected by the two antennas drops below a predesignated or predetermined satisfactory level, controller 19, by means of the first oscillator 6, tunes the two mixers 3, 4 to the alternative frequency having the reception quality that was determined beforehand to be the optimum. This retuning process takes place so rapidly that it is not noticed, or hardly noticed, by the user.

The updating of the stored values of the alternative frequencies can be effected at predesignated time intervals and/or if the reception quality drops below a predesignated level one or more times.

At this point, it should be pointed out that the described receiver is not limited to two antennas. Various changes and modifications are possible within the scope of the inventive concept.

A suitable multipath reception recognition circuit 16 is disclosed in U.S. application Ser. No. 07/744,296, now U.S. Pat. No. 5,222,252 Jun. 22, 1993, and corresponding German application P 40 27 399.7.

What is claimed is:

1. A VHF radio receiver adapted for mobile use, having:

first (1) and second (2) antenna input lines;

first (6) and second (8) oscillators;

a plurality of configuration switches (S1–S5) for selectively applying respective output signals of said oscillators (6,8) to other portions of said receiver;

first (3) and second (4) mixers coupled respectively to said first and second input lines (1, 2) for mixing, in a first configuration of said switches, respective antenna signals with a signal generated: by said first oscillator (6); and means (10), coupled to respective outputs of said mixers, for adding resulting mixed signals, with controllable phase position, to form a summation signal, further comprising, a Radio Data System demodulator (18) coupled to an output of one (4) of said mixers;

memory means for storing alternate frequencies of a plurality of different transmitters carrying an identical program;

control circuit means (19), connected to control inputs of said configuration switches (S1–S5), for momentarily setting said switches to a second configuration in which an output signal of said second mixer (4) is fed to an evaluation circuit (16, 17, 18, 19), said evaluation circuit including a multipath reception recognition circuit (16) having an input connected to outputs of said first (3) and second (4) mixers, and having an output connected to an input of said control circuit means; and an oscillator input of said second mixer (4) is connected to an output of said Second oscillator (8) which tunes said second mixer to one of said alternate frequencies, in order to evaluate quality of reception at said alternate frequency, said control circuit means (19), upon return to said first switch configuration, monitoring quality of reception and triggering switchover to an alternate frequency whenever quality of reception at a current frequency drops below a predetermined level.

2. A radio receiver according to claim 1, wherein said memory means further comprises means for storing a reception quality parameter for each of a plurality of said alternate frequencies, for ranking said alternate frequencies in order of quality, and for designating a best quality alternate frequency for use in case switchover is triggered by said control circuit means.

3. A radio receiver according to claim 2, wherein said alternate frequency reception quality is measured at predetermined time intervals.

4. A radio receiver according to claim 2, wherein said alternate frequency reception quality is measured whenever reception quality at a previously tuned frequency drops below a predetermined level.

* * * * *